United States Patent Office 3,522,260
Patented July 28, 1970

---

3,522,260
1,2,3,4 - TETRAHYDRO - 5H - [1]BENZOPYRANO [3,4-d]PYRIDINES AND 1,2,3,4,13,14 - HEXAHYDRO-5H-[1]BENZOPYRANO[3,4-d]PYRIDINES

Alexander T. Shulgin, Lafayette, Calif., assignor to The Dow Chemical Company, Midland, Mich., a corporation of Delaware No Drawing. Original application Sept. 27, 1965, Ser. No. 490,667, now Patent No. 3,429,889, dated Feb. 25, 1969. Divided and this application Feb. 19, 1968, Ser. No. 717,061

Int. Cl. C07d 99/04

U.S. Cl. 260—294.3

11 Claims

ABSTRACT OF THE DISCLOSURE

New 1,2,3,4 - tetrahydro - 5H - [1]benzopyrano[3,4-d]pyridines and 1,2,3,4,13,14 - hexahydro-5H-[1]benzopyrano[3,4-d]pyridines having useful central nervous system depressant activity are prepared by reaction of a 5-oxo - 1,2,3,4 - tetrahydro - 5H - [1]benzopyrano[3,4-d]pyridine with a lower-alkyl magnesium halide.

---

This application is a division of my prior copending application Ser. No. 490,667, filed Sept. 27, 1965, now U.S. Pat. 3,429,889.

This invention relates to novel chemical compositions of matter known in the art of chemistry as 1,2,3,4-tetrahydro-5H-[1]benzopyrano[3,4-d]pyridines, 1,2,3,4,13,14-hexahydro-5H-[1]benzopyrano[3,4-d]pyridines, to intermediates therefor and to the preparation of the same.

The invention sought to be patented, in one composition aspect, resides in the concept of a class of chemical compounds which I designate as 8-alkyl- (and 8-cycloalkyl-lower-alkyl-) 10-hydroxy-5,5-di-lower-alkyl-1,2,3,4-tetrahydro-5H-[1]benzopyrano[3,4-d]pyridines, 8-alkyl- (and 8-cycloalkyl-lower-alkyl-) 10-hydroxy-5,5-di-lower-alkyl - 1,2,3,4,13,14 - hexahydro - 5H - [1]benzopyrano-[3,4-d]pyridines, and certain ester and ether derivatives thereof. The tangible embodiments of this composition aspect of the invention possess the inherent use characteristics of having CNS depressant properties as determined by standard pharmacological test procedures.

Without limiting the generality of the foregoing, illustrative and preferred embodiments of my 8-alkyl- (and 8-cycloalkyl-lower-alkyl-) 10-hydroxy-5,5-di-lower-alkyl-1,2,3,4-tetrahydro - 5H - [1]benzopyrano[3,4-d]pyridines and 8-alkyl- (and 8-cycloalkyl-lower-alkyl-) 10-hydroxy-5,5 - di-lower-alkyl - 1,2,3,4,13,14 - hexahydro - 5H - [1]benzopyrano[3,4-d]pyridines, are those of Formulas I and II, respectively:

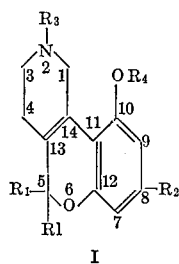

I

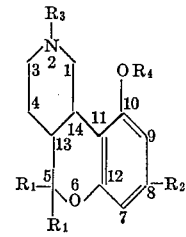

II wherein $R_1$ is lower alkyl; $R_2$ is a member of the group consisting of alkyl and cycloalkyl-lower-alkyl; $R_3$ is lower-alkyl; and $R_4$ is a member of the group consisting of hydrogen, lower-alkyl, lower-alkanoyl, carbamyl, N-lower-alkylcarbamyl, N,N-di-lower-alkyl-carbamyl, and phosphonyl.

As used herein, the term "lower-alkyl" means saturated, monovalent aliphatic-radicals, including straight and branched-chain radicals of from one to six carbon atoms, as illustrated by, but not limited to, methyl, ethyl, propyl, isopropyl, butyl, sec.-butyl, amyl, hexyl, and the like.

As used herein, the term "alkyl" means saturated, monovalent aliphatic radicals, including straight and branched-chain radicals of from one to twenty carbon atoms, as illustrated by, but not limited to, methyl, n-amyl, n-hexyl, 2-heptyl, n-heptyl, 3-methyl-2-octyl, n-octyl, 2-nonyl, 2-tetradecyl, n-hexadecyl, 2-eicosanyl, and the like.

As used herein, the term "cycloalkyl" means cyclic, saturated aliphatic-radicals of from three to eight carbon atoms, as illustrated by, but not limited to, cyclopropyl, cyclobutyl, 2-methylcyclobutyl, cyclohexyl, 4-methylcyclohexyl, cyclocetyl, and the like.

As used herein, the term "lower-alkanoyl" means saturated, monovalent, aliphatic radicals, derived from a monocarboxylic acid, including straight or branched-chain radicals of from one to six carbon atoms, as illustrated by, but not limited to, formyl, acetyl, propionyl, α-methylpropionyl, butyryl, hexanoyl, and the like.

The invention sought to be patented, in another of its composition aspects, resides in the concept of a class of chemical compounds which I designate as 8-alkyl- (and 8-cycloalkyl-lower-alkyl-) 10-hydroxy-5-oxo-1,2,3,4-tetrahydro-5H-[1]benzopyrano[3,4-di]pyridines which I depict as having the Formula III

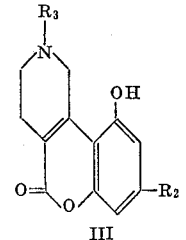

III wherein $R_2$ and $R_3$ have the meanings given above, and which are useful as intermediates in the preparation of the compounds of Formulas I and II.

The invention, in one process aspect, is described as residing in the process of reacting an 8-alkyl- (or 8-cycloalkyl-lower-alkyl-) 10 - hydroxy-5-oxo-1,2,3,4-tetrahydro-5H-[1]benzopyrano[3,4-d]pyridine, illustrated above by Formula III, with a lower-alkyl magnesium halide to prepare an 8-alkyl- (or 8-cycloalkyl-lower-alkyl-) 10-hydroxy - 5,5 - di-lower-alkyl - 1,2,3,4 - tetrahydro-5H-[1] benzopyrano[3,4-d]pyridine, illustrated above by Formula I. The reaction is carried out in an organic solvent inert under the conditions of the reaction. Suitable solvents are diethyl ether, dibutyl ether, tetrahydrofuran, anisole, pyridine, and the like. It is preferred to add a solution of the 8-alkyl- (or 8-cycloalkyl-lower-alkyl-) 10 - hydroxy - 5 - oxo - 1,2,3,4 - tetrahydro-5H-[1]benzopyrano[3,4-d]pyridine in a pyridine or anisole solution or in a mixture of these solvents to a solution of the Grignard reagent in anisole.

The invention, in another of its process aspects, is described as residing in the process of reacting a 1-R₃-4-carbo-lower-alkoxy-3-piperidone with a 5-alkylresorcinol [or a 5-cycloalkyl-lower-alkylresorcinol] to prepare an 8-alkyl- (or 8-cycloalkyl-lower-alkyl-) 10-hydroxy-5-oxo-1,2,3,4-tetrahydro-5H-[1]benzopyrano[3,4-d]pyridine, illustrated above by Formula III. The reaction is carried out in a mixture of concentrated sulfuric acid and phosphorus oxychloride or in the presence of other condensation agents such as aluminum chloride, hydrogen chloride, and polyphosphoric acid and is illustrated by the equation:

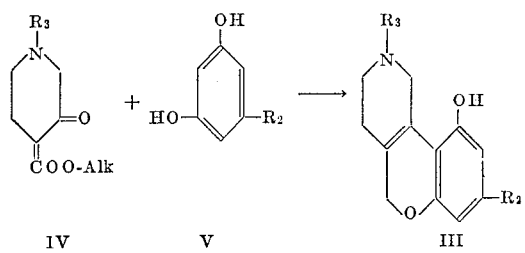

where $R_2$ and $R_3$ are defined as above.

The invention in still another of its process aspects is described as residing in the process of reducing with hydogen over a suitable catalyst at the 8-alkyl- (and 8-cycloalkyl-lower-alkyl)-10-dydroxy-5,5-di-lower-alkyl - 1,2,3,4-tetrahydro-5N-[1]benzopyrano[3,4-d]pyridines of Formula I to produce the 8-alkyl- (and 8-cycloalkyl-lower-alkyl) 10 - hydroxy-5,5-di-lower-alkyl,1,2,3,4,13,14 - hexahydro-5H-[1]benzopyrano[3,4-d]pyridines of Formula II. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of Formulas I and II, i.e. the compounds where $R_4$ is lower-alkyl, lower-alkanoyl, carbamyl, N-lower-alkylcarbamyl, N,N-di-lower-alkylcarbamyl, or phosphonyl are prepared by reacting the corresponding compound where $R_4$ is hydogen, preferably in the presence of a basic catalyst, with a lower-alkyl halide, to produce the compounds where $R_4$ is lower-alkyl; with a lower-alkanoic anhydride (or mixed anhydride), to produce the compounds where $R_4$ is lower-alkanoyl; with a molar equivalent of phosgene followed by reaction of the resulting chloroformate with ammonia, a lower-alkylamine, or a di-lower-alkylamine, to produce the compounds where $R_4$ is, respectively, carbamyl, N-lower-alkylcarbamyl, or N,N-di-lower-alkylcarbamyl; or with one molar equivalent amount of phosphorus oxychloride followed by reaction of the resulting dichlorophosphinate with aqueous sodium or potassium carbonate, to produce the compounds where $R_4$ is phosphonyl. Suitable solvents are benzene, toluene, xylene and the like, and suitable basic catalysts are alkali metal carbonate, bicarbonates, or hydroxides, dimethylaniline, pyridine, and the like.

The intermediate 5-alkyl- or 5-cycloalkyl-lower-alkyl-resorcinols of Formula V are conveniently prepared by methods generally known in the art comprising dehydration of 3,5-di-lower-alkoxyphenyl alkyl (or cycloalkyl-alkyl) carbinol, reduction of the resulting 3,5-di-lower-alkoxyphenylalkene (or di - lower - alkoxyphenyl-cycloalkyl-lower-alkene), and hydriodic acid cleavage of the ether groups to the corresponding 5-alkyl- (or 5-cyclo-alkyl-lower-alkyl-)resorcinol. The starting carbinols in turn are prepared by reaction of an appropriate Grignard reagent with a 3,5-di-lower-alkoxybenzoic acid ester, amide, or 3',5'-di-lower-alkoxyalkanophenone (or 3',5'-di-lower-alkoxycycloalkyl-lower-alkanophenone).

The intermediate 1 - R - 4-carbo-lower-alkoxy-3-piperidones of Formula IV are prepared by the method of Prill and McElvain, J. Am. Chem. Soc. 55, 1233 (1933) and of McElvain and Vozza, J. Am. Chem. Soc. 71,896 (1948).

Due to the presence of a basic tertiary amino grouping, the compounds of this invention form acid-addition and quaternary ammonium salts. The compounds of Formulas I and II, in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts of the compounds of Formulas I and II are obtained by the addition of esters of strong acids to the free base form of the compounds, said esters having a molecular weight less than about 300. A preferred class of esters comprises alkyl, alkenyl, and phenyl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride pentachlorobenzyl chloride, p-nitrobenzyl chloride, p-methyloxybenzyl chloride, and the like.

It will thus be appreciated that each of Formula I and II not only represents the structural configuration of the bases of my invention but each is also representative of the respective structural entity which is common to all of my respective compounds of Formulas I and II whether in the form of the free bases or in the form of the salts of the bases. I have found that by virtue of this common structural entity, the bases and their acid-addition salts as well as the quaternary ammonium salts have inherent pharmacodynamic activity of a type to be more fully described hereinbelow. This inherent pharmaoodynamic activity can be enjoyed in useful form for pharmaceutical purposes by employing the free bases themselves or the acid-addition or quaternary ammonium salts formed from pharmaceutically-acceptable acids or esters of strong acids, that is, acids or esters whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the acid-addition salt with aqueous base as explained above, or alternatively, the acid-addition salt can be converted to any desired pharmaceutically-acceptable acid-addition salt by double decomposition reactions involving the anion, for example, by ion-exchange procedures.

As in the case of the acid-addition salts, water-insolubility, high toxicity, or lack of crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Moreover, apart from their usefulness in pharmaceutical applications, my salts are useful as characterizing or identifying derivatives of the free bases or in isolation or purification procedures. Such characterizing or purification acid-addition salt derivatives, like all of the acid-addition salts, can, if desired, be used to regenerate the pharmaceutically-acceptable free bases by reaction of the salts with aqueous base, or alternatively the acid-addition or quaternary ammonium salt can be converted to a pharmaceutically-acceptable salt by, for example, ion-exchange procedures.

It will be appreciated from the foregoing that all of the acid-addition and quaternary ammonium salts of my new bases are useful and valuable compounds regardless of considerations of solubility, toxicity, physical form, and the like and accordingly are within the purview of the instant invention.

The novel features of the compounds of the invention, then, resides in the concept of the bases and the cationic forms of the new compounds of Formulas I and II and not in any particular acid or ester moiety or anion associated with the salt forms of the compounds; rather, the acid or ester moieties or anions which can be associated in the salt forms are in themselves neither novel nor critical and therefore can be any anion or acid-like substance capable of salt formation with bases. In fact, in aqueous solutions, the base form or water-soluble acid-addition salt form of the compounds of the invention both possess a common protonated cation or ammonium ion.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and an ester of a strong acid in an inert solvent. Heating may be used to facilitate the reaction, although salt formation usually takes place readily at room temperature. The quaternary ammonium salt separates directly or can be obtained by concentration of the solution.

The compounds of Formulas I and II have been shown to possess central nervous system depressant activity as evidenced by gross overt changes induced by intravenous administration in mice in standard tests involving observations of psychomotor activity, reactivity to stimuli, and ability to perform normal, non-conditioned motor tasks. This activity indicates their usefulness as psychotropic agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The molecular structures of the compounds of my invention were assigned on the basis of study of their infrared, ultraviolet and NMR spectra and their transformation products, and confirmed by the correspondence of calculated and found values for the elementary analyses for representative examples.

The following examples will further illustrate the invention without, however, limiting it thereto.

EXAMPLE 1

10-hydroxy-2,5,5,8-tetramethyl-1,2,3,4-tetrahydro-5H-[1]benzopyrano[3,4-d]pyridine (A) 2,8-dimethyl-10-hydroxy-5-oxo-1,2,3,4-tetrahydro-5H-[1]benzopyrano[3,4-d]pyridine.—To a mixture of 7 g. (0.032 mole) of N-methyl-4-carbethoxy-3-piperidone hydrochloride and 5 g. (0.04 mole) of 5-methylresorcinol was added dropwise with cooling 16 ml. of concentrated sulfuric acid. The mixture was then treated all at once with 6 ml. of phosphorous oxychloride, and the viscous reaction mixture was stirred at room temperature for twenty-four hours and then poured into an excess of aqueous sodium bicarbonate. The solid which separated was collected by filtration, washed with water, dried in a vacuum desiccator, and recrystallized from acetonitrile to give 2.1 g. of 2,8-dimethyl-10-hydroxy-5-oxo-1,2,3,4-tetrahydro - 5H - [1]benzopyrano[3,4-d]pyridine, M.P. 219–224° C.

(B) The latter (2 g., 0.0085 mole), dissolved in 20 ml. of dry pyridine, was heated to 50–60° C. and added dropwise to a solution of methyl magnesium iodide [prepared from 4.9 ml. (0.08 mole) of methyl iodide and 2 g. (0.082 mole) of magnesium] in 35 ml. of freshly distilled anisole. When addition was complete, the viscous mixture was stirred and heated at 45–65° C. overnight. The mixture was diluted with 100 ml. of water and a large excess of 4 N sulfuric acid and steam-distilled to remove the anisole. The residual mixture was basified by the addition of solid sodium carbonate and steam-distilled again to remove the pyridine. The solid which separated was filtered off, dried, and extracted with diethyl ether in a Soxhlet extractor. From the extracts, three crops totaling 0.81 g. of 10-hydroxy-2,5,5,8-tetramethyl-1,2,3,4-tetrahydro-5H[1]benzopyrano[3,4-d]pyridine, M.P. 215–217° C. (dec.), were obtained.

EXAMPLE 2

5,5-di-(1-hexyl)-2,8-dimethyl-10-hydroxy-1,2,3,4-tetrahydro-5H-[1]benzopyrano[3,4-d]pyridine By retacting 2,8-dimethyl-10-hydroxy-5-oxo-1,2,3,4-tetrahydro - 5H-[1]benzopyrano[3,4-d]pyridine with n-hexyl magnesium bromide, using the manipulative procedure described above in Example 1B, there is obtained 5,5 - di - (1-hexyl)-2,8-dimethyl-10-hydroxy-1,2,3,4-tetrahydro-5H-[1]benzopyrano[3,4-d]pyridine.

EXAMPLE 3

10-hydroxy-8-(1-pentyl)-2,5,5-trimethyl-1,2,3,4-tetrahydro-5H-[1]benzopyrano[3,4-d]pyridine (A) 10-hydroxy - 2-methyl-5-oxo-8-(1-pentyl)-1,2,3,4-tetrahydro - 5H - [1]benzopyrano[3,4-d]pyridine.—Following a procedure similar to that described in Example 1A hereinabove, 5.62 g. (0.031 mole) of 5-(1-pentyl)resorcinol was reacted with 6.65 g. (0.03 mole) of N-methyl-4-carbethoxy-3-piperidone by hydrochloride in the presence of 12 ml. of concentrated sulfuric acid and 6 ml. of phosphorus oxychloride to yield 1.44 g. of 10-hydroxy - 2 - methyl-5-oxo-8-(1-pentyl)-1,2,3,4-tetrahydro-5H-[1]benzopyrano[3,4-d]pyridine, M.P. 146–147.5° C.

(B) The latter (3.01 g., 0.01 mole) was reacted with 0.1 mole of methyl magnesium iodide following the procedure of Example 1B hereinabove to yield 1.5 g. of 10-hydroxy - 8-(1-pentyl)-2,5,5-trimethyl-1,2,3,4-tetrahydro-5H-[1]benzopyrano[3,4-d]pyridine, M.P. 187–188° C.

EXAMPLE 4

8-(2-heptyl)-10-hydroxy-2,5,5-trimethyl-1,2,3,4-tetrahydro-5H-[1]benzopyrano[3,4-d]pyridine (A) 5-(2-heptyl)resorcinol.—A solution of 45 g. (0.19 mole) of 3',5'-dimethoxyhexanophenone in 400 ml. of dry ether was added dropwise to a freshly prepared solution of 0.30 mole of methyl magnesium iodide in 150 ml. of ether. This mixture was heated under reflux for one hour, cooled, and carefully decomposed with 275 ml. of saturated aqueous ammonium chloride. Separation of the ether layer, extraction of the aqueous phase with ether, and evaporation of the dried combined extracts to dryness afforded 49.4 g. of 2-(3,5-dimethoxyphenyl)-2-heptanol as an oil, which was not further purified.

The latter was treated with 1 ml. of 20% sulfuric acid and heated at 105–125° C./35 mm. for one hour and a half. The mixture was then cooled and extracted with ether, and the ether extracts washed with aqueous sodium bicarbonate and water, dried over sodium sulfate, and evaporated to dryness. Distillation of the residue in vacuo gave 34.1 g. of 2-(3,5-dimethoxyphenyl)-2-heptene, B.P. 132–140° C./4 mm., $n_D^{25}$ 1.5251.

The latter (33 g., 0.14 mole), dissolved in 100 ml. of absolute ethanol, was reduced with hydrogen at 1,500 pounds p.s.i. over 6 g. of Raney nickel at 150° C. After removing the catalyst by filtration and evaporation of the filtrate to dryness, the residue was distilled in vacuo to give 26 g. of 2-(3,4-dimethoxyphenyl)heptane, B.P. 137–139° C./1 mm., $n_D^{25}$ 1.4957.

The latter (26 g., 0.11 mole), dissolved in 118 ml. (0.9 mole) of 57% hydriodic acid, was treated carefully with 156 ml. (1.6 moles) of acetic anhydride. When the exothermic reaction had subsided, the mixture was heated in an oil bath at 155° C. for two hours, cooled, and poured into a mixture of ice and water. The mixture was stored in a refrigerator overnight, and the gummy semi-solid which separated was collected, washed with water, and dried over sulfuric acid to give 22.1 g. of 5-(2-heptyl) resorcinol which was not purified further.

(B) 8-(2-heptyl) - 10 - hydroxy-2-methyl-5-oxo-1,2,3,4-tetrahydro - 5H - [1]benzopyrano[3,4-d]pyridine hydrochloride.—Following a procedure similar to that described in Example 1A hereinabove, 6.7 g. (0.031 mole) of N-methyl-4-carbethoxy-3-piperidone hydrochloride was reacted with 6.5 g. (0.031 mole) of 5-(2-heptyl)resorcinol in the presence of 12 ml. of concentrated sulfuric acid and 6 ml. of phosphorus oxychloride to yield 1.7 g. of 8-(2-heptyl)-10-hydroxy - 2 - methyl-5-oxo-1,2,3,4-tetrahydro-5H-[1]benzopyrano[3,4-d]pyridine hydrochloride, M.P. 210–212° C.

(C) The latter (2.82 g., 0.008 mole), in the form of the free base, was reacted with 0.1 mole of methyl magnesium iodide following the procedure of Example 1B hereinabove to yield 0.38 g. of 8-(2-heptyl)-10-hydroxy-2,5,5-trimethyl - 1,2,3,4 - tetrahydro-5H-[1]benzopyrano[3,4-d] pyridine, M.P. 183–184° C.

EXAMPLE 5

8-(1-cyclohexylethyl)-10-hydroxy-2,5,5-trimethyl-1,2,3,4-tetrahydro-5H-[1]benzopyrano[3,4-d]pyridine (A) 5-(1-cyclohexylethyl)resorcinol.—To a solution of cyclohexyl magnesium chloride [prepared from 177.1 g. (1.5 moles) of chlorocyclohexane and 24.3 g. (1.0 g. atom) of magnesium] in 300 ml. of ether was added 45.2 g. (0.25 mole) of 3,5-dimethoxybenzamide in portions over a period of one hour. The mixture was stirred and refluxed for fifty hours, allowed to stand at room temperature for sixty-four hours, and then poured into one liter of crushed ice and water containing 80 ml. of concentrated sulfuric acid. The organic layer was separated, the aqueous phase extracted with ether, and the combined ether extracts washed with saturated sodium chloride, dried over anhydrous magnesium sulfate, charcoaled, filtered, and taken to dryness yielding an oil which was distilled in vacuo to give 39.3 g. of cyclohexyl 3,5-dimethoxyphenyl ketone, B.P. 141–162° C./0.1 mm.; $n_D^{25}$ 1.5403.

The latter (39 g., 0.157 mole), dissolved in 200 ml. of ether, was reacted with 0.2 mole of methyl magnesium iodide following a procedure similar to that used in Example 4A hereinabove to give 40.6 g. of 1-cyclohexyl-1-(3,5-dimethoxyphenyl)ethanol.

The latter was reacted with 1.0 ml. of 20% sulfuric acid at 130–140° C. for thirty minutes following a procedure similar to that used in Example 4A hereinabove to give 27.7 g. of [1 - (3.5-dimethoxyphenyl)ethylidenyl]cyclohexane. B.P. 114–120° C./0.1 mm.; $n_D^{25}$ 1.5408.

The latter (27 g., 011 mole) was reduced with hydrogen over Raney nickel following a procedure similar to that used in Example 4A hereinabove to give 20.8 g. of 5-(1-cyclohexylethyl) - 1,3 - dimethoxybenzene, B.P. 115–118° C./0.12 mm., $n_D^{25}$ 1.5262. The latter (0.084 mole) was demethylated with 84 ml. of hydriodic acid in 84 ml. of acetic anhydride following a procedure similar to that used in Example 4A hereinabove to give 14.7 g. of 5-(1-cyclohexylethyl)resorcinol, M.P. 65–69° C.

(B) 8 - (1 - cyclohexylethyl) - 10 - hydroxy - -2-methyl-5 - oxo - 1,2,3,4 - tetrahydro - 5H-[1]benzopyrano [3,4-d] pyridine.—Following a procedure similar to that described in Example 1A hereinabove 8.9 g. (0.04 mole) of N-methyl - 4 - carbethoxy-3-piperidone hydrochlorine was reacted with 7.0 g. (0.03 mole) of 5-(1-cyclohexylethyl) resorcinol in the presence of 12 ml. of concentrated sulfuric acid and 6 ml. of phosphorus oxychloride to yield 5.58 g. of 8-(1-cyclohexylethyl) - 10 - hydroxy-2-methyl-5 - oxo - 1,2,3,4 - tetrahydro - 5H-[1]benzopyrano[3,4-d] pyridine, M.P. 200–202° C.

(C) The latter (3.4 g., 0.01 mole) was reacted with 0.1 mole of methyl magnesium iodide following the procedure of Example 1B hereinabove to yield 8 - (1-cyclohexylethyl) - 10 - hydroxy - 2,5,5,-trimethyl-1,2,3,4-tetrahydro - 5H - [1]benzopyrano[3,4 - d]pyridine, M.P. 187–189° C.

EXAMPLE 6

8-(3-cyclopropyl - 2 - propyl) - 10 - hydroxy - 2,5,5-trimethyl - 1,2,3,4 - tetrahydro - 5H - [1]-benzopyrano [3,4-d]pyridine (A) 5-(3-cyclopropyl - 2 - propyl)resorcinol.—By reacting cyclopropylmethyl magnesium bromide with 3,5-dimethoxybenzamide; reacting the resulting cyclopropylmethyl 3,5-dimethoxyphenyl ketone with methyl magnesium iodine; dehydrating the resulting 1-cyclopropyl-2-(3,5-dimethoxyphenyl) - 2 - propanol with 20% sulfuric acid; reducing with hydrogen over Raney nickel the resulting 1-cyclopropyl - 2 - (3,5-dimethoxyphenyl)-1-propene; and demethylating the resulting 1-cyclopropyl-2-(3,5-dimethoxyphenyl)propane with hydriodic acid in acetic anhydride using the manipulative procedures given above in Examples 4A and 5A, there is obtained 5-(3-cyclopropyl)2-propyl-resorsinol.

(B) 8 - (3-cyclopropyl-2-propyl)-10-hydroxy-2-methyl-5 - oxo - 1,2,3,4 - tetrahydro - 5H - [1]benzopyrano[3,4-d]pyridine.—Following a procedure similar to that described in Example IA hereinabove, N-methyl-4-carbethoxy-3-piperidone is reacted with 5-(3-cyclopropyl-2-propyl)resorcinol to give 8-(3-cyclopropyl - 2 - propyl)-10-hydroxy - 2 - methyl - 5 - oxo - 1,2,3,4-tetrahydro-5H-[1]benzopyrano[3,4-d]pyridine.

(C) The latter is reacted with methyl magnesium iodide following the procedure of Example 1B hereinabove to give 8-(3-cyclopropyl - 2 - propyl)-10-hydroxy-2,5,5-trimethyl-1,2,3,4-tetrahydro - 5H - [1]benzopyrano [3,4-d]pyridine.

EXAMPLE 7

10 - hydroxy - 8 - (3 - methyl - 2 - octyl) - 2,5,5 - trimethyl - 1,2,3,4 - tetrahydro - 5H - [1]-benzopyrano [3,4-d]pyridine (A) 10 - hydroxy - 2 - methyl - 8 - (3 - methyl - 2-octyl) - 5 - oxo - 1,2,3,4 - tetrahydro - 5H [1]benzopyrano[3,4 - d]pyridine.—Following a procedure similar to that described in Example 1A hereinabove, 13.0 g. (0.05 mole) of N-methyl-4-carbethoxy - 3 - piperidone hydrochloride was reacted with 16 g. (0.067 mole) of 5-(3 - methyl - 2 - octyl)resorcinol in the presence of 32 ml. of concentrated sulfuric acid and 12 ml. of phosphorus oxychloride to yield 21 g. of 10 - hydroxy - 2-methyl-8-(3-methyl-2-octyl) -5 - oxo - 1,2,3,4-tetrahydro-5H - [1]benzopyrano[3,4 - d]pyridine as a viscous oil.

(B) The latter (0.05 mole) was reacted with methyl magnesium iodide following the procedure of Example IB hereinabove to yield 2.7 g. of 10-hydroxy-8-(3-methyl - 2 - octyl) - 2,5,5 - trimethyl - 1,2,3,4 - tetrahydro - 5H - [1]benzopyrano[3,4-d]pyridine as feathery crystals, M.P. 178–179° C.

EXAMPLE 8

10 - hydroxy - 8 - (2 - tetradecyl) - 2,5,5-trimethyl-1,2,3, 4 - tertahydro - 5H - [1]benzopyrano[3,4 - d]pyridine hydriodide (A) 5 - (2 - tetradecyl)resorcinol.—Following a procedure similar to that described in Example 5A hereinabove, 0.2 mole of a Grignard reagent prepared from 60 g. (0.24 mole) of 1-bromododecane and 4.8 g. (0.20 atom) of magnesium was reacted with 9.05 g. (0.05 mole) of 3,5-dimethoxy-benzamide in diethyl ether, and the resulting 1-dodecyl 3,5-dimethoxyphenyl ketone (43 g., 0.13 mole) was reacted with methyl magnesium iodide using a procedure similar to that used in Example 4A hereinabove. Dehydration of the resulting 2-(3,5-dimethoxyphenyl)-2-tetradecanol (13.5 g., 0.039 mole) with 1 ml. of 20% sulfuric acid to the corresponding 2-(3,5-dimethoxyphenyl)-2-tetradecene, catalytic reduction of the latter (26 g., 0.078 mole) with hydrogen over 6 g. of Raney nickel and cleavage of the resulting 2-(3,5-dimethoxyphenyl)tetradecane (20 g., 0.06 mole) with 60 ml. of 57% hydriodic acid in 60 ml. of acetic anhydride, all according to the procedure described in Example 4A hereinabove, afforded 15.7 g. of 5-(2-tetradecyl)resorcinol, M.P. 61–63° C.

(B) 10 - hydroxy - 2 - methyl - 5 - oxo - 8 - (2 - tetradecyl) - 1,2,3,4 - tetrahydro - 5H - [1]benzopyrano [3,4-d]pyridine.—Following a procedure similar to that described in Example IA hereinabove, 9.7 g. (0.044 mole) of N-methyl - 4 - carbethoxy - 3 - piperidone hydrochloride was reacted with 7.0 g. (0.022 mole) of 5-(2- tetradecyl)resorcinol in the presence of 12 ml. of concentrated sulfuric acid and 6 ml. of phosphorus oxychloride to yield 2.1 g. of 10-hydroxy - 2 - methyl - 5 - oxo - 8 - (2-tetradecyl) - 1,2,3,4 - tetrahydro - 5H - [1]benzopyrano [3,4-d]-pyridine, M.P. 131–132.5° C.

(C) The latter (3.5 g., 0.0081 mole) was reacted with 0.1 mole of methyl magnesium iodide following the procedure of Example 1B hereinabove to yield 0.72 g. of 10-hydroxy-8 - (2-tetradecyl)-2,5,5-trimethyl-1,2,3,4-tetrahydro - 5H - [1]benzopyrano[3,4-d]pyridine hydriodide, M.P. 222–223° C.

EXAMPLE 9

8-(2-eicosyl)-10-hydroxy-2,5,5-trimethyl-1,2,3,4-tetrahydro-5H-[1]benzopyrano[3,4-d]pyridine (A) 5-(2-eicosyl)resorcinol.—Following a procedure similar to that used in Example 5A hereinabove, a Grignard reagent, prepared from 333.4 g. (1.0 mole) of 1-bromooctadecane and 24.3 g. (1.0 g. atom) of magnesium in 500 ml. of anhydrous ether, was reacted with 45.2 g. (0.25 mole) of 3,5-dimethoxybenzamide to give 58.9 g. of 1-octadecyl 3,5-dimethoxyphenyl ketone, M.P. 67–71° C.

The latter (56.5 g., 0.135 mole), slurried in 600 ml. of anhydrous ether and 100 ml. of tetrahydrofuran, was reacted with 0.2 mole of freshly prepared methyl magnesium iodide in 100 ml. of anhydrous ether following a procedure similar to that used in Example 4A hereinabove to give 48.1 g. of 2-(3,5-dimethoxyphenyl)-2-eicosanol, M.P. 51–54° C.

The latter (27.1 g., 0.085 mole) was reacted with 1.0 ml. of 20% sulfuric acid at 130–140° C. for thirty minutes following a procedure similar to that used in Example 4A hereinabove, to give 19.2 g. of 2-(3,5-dimethoxyphenyl)-2-eicosene, M.P. 35–37° C.

The latter (19 g., 0.046 mole) was reduced with hydrogen over 3 g. of Raney nickel following a procedure similar to that used in Example 4A hereinabove to give 14.8 g. of 2-(3,5-dimethoxyphenyl)eicosane which was demethylated with 35 ml. of 57% hydriodic acid in 35 ml. of acetic anhydride following a procedure similar to that used in Example 4A hereinabove to give 11.5 g. of 5-(2-eicosyl)resorcinol, M.P. 75.5–76.5° C.

(B) 8-(2-eicosyl) - 10 - hydroxy - 2 - methyl-5-oxo-1,2,3,4 - tetrahydro - 5H - [1]benzopyrano[3,4 - d]pyridine.—Following a procedure similar to that used in Example 1A hereinabove, N-methyl-4-carbethoxy-3-piperidone hydrochloride is reacted with 5-(2-eicosyl)resorcinol to give 8-(2-eicosyl)-10-hydroxy-2-methyl-5-oxo-1,2,3,4-tetrahydro-5H-[1]benzopyrano[3,4-d]pyridine.

(C) The latter is reacted with methyl magnesium iodide following the procedure of Example 1B hereinabove to give 8-(2-eicosyl) - 10 - hydroxy-2,5,5-trimethyl-1,2,3,4-tetrahydro-5H-[1]benzopyrano[3,4-d]pyridine.

EXAMPLE 10

5,5-dimethyl - 10 - hydroxy-8-(3-methyl-2-octyl)-2-(1-pentyl) - 1,2,3,4 - tetrahydro-5H-[1]benzopyrano[3,4-d] pyridine (A) Following a procedure similar to that used in Example 1A hereinabove, N-(1-pentyl)-4-carbethoxy-3-piperidone [prepared according to the method of Prill et al., loc. cit., that is by Dieckmann cyclization of γ-carbethoxypropylcarbethoxymethyl-1-pentylamine] is reacted with 5-(3-methyl-2-octyl)resorcinol to give 10-hydroxy- 8-(3-methyl-2-octyl)-5-oxo-2-(1-pentyl) - 1,2,3,4 - tetrahydro-5H-[1]benzopyrano[3,4-d]pyridine.

(B) The latter is reacted with methyl magnesium iodide following the procedure of Example 1B hereinabove to give 5,5-dimethyl - 10 - hydroxy-8-(3-methyl-2-octyl)-2-(1-pentyl)-1,2,3,4-tetrahydro - 5H - [1]benzopyrano[3,4-d]pyridine, M.P. 159.5–160.5° C.

EXAMPLE 11

5,5 - dimethyl - 10 - hydroxy-8-(3-methyl-2-octyl)-2-(1-propyl)-1,2,3,4-tetrahydro-5H-[1]benzopyrano[3,4 - d]pyridine (A) Following a procedure similar to that used in Example 1A hereinabove, N-(1-propyl)-4-carbethoxy-3-piperidone [prepared according to the procedure of Prill et al., loc. cit., that is by Dieckmann cyclization of γ-carbethoxypropylcarbethoxymethyl - (1 - propyl)amine] is reacted with 5-(3-methyl-2-octyl)resorcinol to give 10-hydroxy-8-(3-methyl - 2 - octyl)-5-oxo-2-(1-propyl)-1,2,3,4-tetrahydro-5H-[1]benzopyrano[3,4-d]pyridine.

(B) The latter is reacted with methyl magnesium iodide following the procedure of Example 1B hereinabove to give 5,5-dimethyl - 10 - hydroxy-8-(3-methyl-2-octyl)-2-(1-propyl) - 1,2,3,4 - tetrahydro - 5H - [1]benzopyrano[3,4-d]pyridine, M.P. 178–180° C.

EXAMPLE 12

10-hydroxy-8-(3-methyl - 2 - octyl)-2,5,5-trimethyl-1,2,3,4,13,14 - hexahydro - 5H - [1]benzopyrano[3,4-d]pyridine hydrochloride 10-hydroxy-8-(3-methyl - 2 - octyl)-2,5,5-trimethyl-1,2,3,4-tetrahydro-5H-[1]benzopyrano[3,4-d]pyridine (2.0 g., 0.0053 mole) was dissolved in 200 ml. of absolute methanol and reduced over 2 g. of Raney nickel catalyst under 53 pounds p.s.i. of hydrogen. When reduction was complete, the catalyst was removed by filtration, and the filtrate was taken to dryness. The residual glassy material was taken into petroleum ether and the solution acidified with anhydrous hydrogen chloride and diluted with ether. The oily gum which separated slowly crystallized to a colorless solid which was collected to give 1.4 g. of 10-hydroxy-8-(3-methyl - 2 - octyl)-2,5,5-trimethyl-1,2,3,4,13,14-hexahydro - 5H - [1]benzopyrano[3,4-d]pyridine hydrochloride, M.P. 80–85° C.

EXAMPLE 13

10-hydroxy-2,5,5,8-tetramethyl-1,2,3,4,13,14-hexahydro-5H-[1]benzopyrano[3,4-d]pyridine Following a procedure similar to that described in Example 12 hereinabove, 10-hydroxy-2,5,5,8-tetramethyl-1,2,3,4-tetrahydro - 5H - [1]benzopyrano[3,4-d]pyridine is reduced with hydrogen to give 10-hydroxy-2,5,5,8-tetramethyl - 1,2,3,4,13,14 - hexahydro-5H-[1]benzopyrano[3,4-d]pyridine.

EXAMPLE 14

5,5-di-(1-hexyl)-2,8-dimethyl-10-hydroxy-1,2,3,4,13,14-hexahydro-5H-[1]benzopyrano[3,4-d]pyridine Following a procedure similar to that described in Example 12 hereinabove, 5,5-di-(1-hexyl)-2,8-dimethyl-10-hydroxy - 1,2,3,4 - tetrahydro-5H-[1]benzopyrano[3,4-d]pyridine is reduced with hydrogen to 5,5-di-(1-hexyl)-2,8-dimethyl - 10 - hydroxy-1,2,3,4,13,14-hexahydro-5H-[1]benzopyrano[3,4-d]pyridine.

EXAMPLE 15

10 - hydroxy - 8 - (1-pentyl)-2,5,5-trimethyl-1,2,3,4,13,14-hexahydro-5H-[1]benzopyrano[3,4-d]pyridine Following a procedure similar to that described in Example 12 hereinabove, 10-hydroxy-8-(1-pentyl)-2,5,5-trimethyl - 1,2,3,4 - tetrahydro-5H-[1]benzopyrano[3,4-d]pyridine is reduced with hydrogen to give 10-hydroxy-8-(1-pentyl) - 2,5,5 - trimethyl-1,2,3,4,13,14-hexahydro-5H-[1]benzopyrano[3,4-d]pyridine.

EXAMPLE 16

8 - (2 - heptyl)-10-hydroxy-2,5,5-trimethyl-1,2,3,4,13,14-hexahydro-5H-[1]benzopyrano[3,4-d]pyridine Following a procedure similar to that described in Example 12 hereinabove, 8-(2-heptyl)-10-hydroxy-2,5,5-trimethyl - 1,2,3,4 - tetrahydro - 5H[1]benzopyrano[3,4-d]pyridine is reduced with hydrogen to give 8-(2-heptyl)-10 - hydroxy - 2,5,5 - trimethyl-1,2,3,4,13,14-hexahydro-5H-[1]benzopyrano[3,4-d]pyridine.

EXAMPLE 17

8-(1-cyclohexylethyl) - 10 - hydroxy-2,5,5-trimethyl-1,2,3,4,13,14 - hexahydro - 5H - [1]benzopyrano[3,4-d]pyridine Following a procedure similar to that described in Example 12 hereinabove, 8-(1-cyclohexylethyl)-10-hydroxy-2,5,5-trimethyl - 1,2,3,4 - tetrahydro-5H-[1]benzopyrano[3,4-d]pyridine is reduced with hydrogen to give 8-(1-cyclohexylethyl) - 10 - hydroxy - 2,5,5 - trimethyl-1,2,3,4,13,14-hexahydro - 5H - [1]benzopyrano[3,4-d]pyridine.

EXAMPLE 18

8 - (3 - cyclopropyl - 2 - propyl) - 10 - hydroxy-2,5,5-trimethyl - 1,2,3,4,13,14 - hexahydro-5H[1]benzopyrano[3,4-d]pyridine Following a procedure similar to that described in Example 12 hereinabove, 8 - (3-cyclopropyl-2-propyl)-10-hydroxy-2,5,5-trimethyl - 1,2,3,4 - tetrahydro - 5H - [1]benzopyrano[3,4-d]pyridine is reduced with hydrogen to give 8 - (3 - cyclopropyl - 2 - propyl) - 10 - hydroxy-2,5,5-trimethyl-1,2,3,4,13,14-hexahydro - 5H - [1]benzopyrano[3,4-d]pyridine.

EXAMPLE 19

10 - hydroxy - 8 - (2 - tetradecyl) - 2,5,5 - trimethyl-1,2,3,4,13,14-hexahydro - 5H - [1]-benzopyrano[3,4-d]pyridine.

Following a procedure similar to that described in Example 12 hereinabove, 10 - hydroxy-8-(2-tetradecyl)-2,5,5-trimethyl-1,2,3,4-tetrahydro - 5H - [1]benzopyrano[3,4-d]pyridine is reduced with hydrogen to give 10-hydroxy - 8 - (2 - tetradecyl)-2,5,5-trimethyl-1,2,3,4,13,14-hexahydro - 5H - [1]benzopyrano[3,4-d]pyridine.

EXAMPLE 20

8 - (2 - eicosyl)-10-hydroxy-2,5,5-trimethyl-1,2,3,4,13,14-hexahydro - 5H - [1]benzopyrano[3,4-d]pyridine Following a procedure similar to that described in Example 12 hereinabove, 8 - (2-eicosyl) - 10 - hydroxy-2,5,5-trimethyl - 1,2,3,4 - tetrahydro-5H-[1]benzopyrano[3,4-d]pyridine is reduced with hydrogen to give 8-(2-eicosyl) - 10 - hydroxy - 2,5,5 - trimethyl-1,2,3,4,13,14-hexahydro - 5H - [1]benzopyrano[3,4-d]pyridine.

EXAMPLE 21

5,5 - dimethyl - 10 - hydroxy-8-(3-methyl-2-octyl)-2-(1-pentyl) - 1,2,3,4,13,14-hexahydro - 5H - [1]benzopyrano[3,4-d]pyridine Following a procedure similar to that described in Example 12 hereinabove, 5,5 - dimethyl - 10 - hydroxy-8 - (3 - methyl - 2 - octyl) - 2 - (1 - pentyl)-1,2,3,4-tetrahydro - 5H - [1]benzopyrano[3,4-d]pyridine is reduced with hydrogen to give 5,5 - dimethyl - 10 - hydroxy - 8-(3-methyl - 2 - octyl)-2-(1-pentyl)-1,2,3,4,13,14 - hexahydro-5H-[1]benzopyrano[3,4-d]pyridine.

EXAMPLE 22

5,5 - dimethyl - 10 - hydroxy-8-(3-methyl-2-octyl)-2-(1-propyl) - 1,2,3,4,13,14 - hexahydro - 5H - [1]benzopyrano[3,4-d]pyridine Following a procedure similar to that described in Example 12 hereinabove, 5,5 - dimethyl-10-hydroxy-8-(3- methyl - 2 - octyl) - 2 - (1 - propyl) - 1,2,3,4-tetrahydro-5H - [1]benzopyrano[3,4-d]pyridine is reduced with hydrogen to give 5,5-dimethyl - 10 - hydroxy - 8 - (3-methyl-2-octyl) - 2 - (1-propyl)-1,2,3,4,13,14-hexahydro-5H-[1]benzopyrano[3,4-d]pyridine.

EXAMPLE 23

10 - acetoxy - 8 - (3 - methyl - 2 - octyl)-2,5,5-trimethyl-1,2,3,4 - tetrahydro - 5H - [1]benzopyrano[3,4-d]pyridine A solution of 5 g. (0.012 mole) of 10-hydroxy-8-(3-methyl - 2 - octyl)-2,5,5-trimethyl-1,2,3,4-tetrahydro-5H-[1]benzopyrano[3,4-d]pyridine in 60 ml. of acetic anhydride was heated overnight at 70–75° C. The reaction mixture was evaporated to dryness, the residue dissolved in 20 ml. of water, and the solution was made basic with aqueous sodium bicarbonate and extracted with benzene. Drying of the extracts over sodium sulfate, evaporation of the extracts to dryness, and fractional distillation of the dark residue in vacuo afforded two fractions, one (0.84 g.) boiling at 175–214 C./0.40–0.7 mm. and another (1.0 g.) boiling at 218–224° C./0.9 mm.

Thin layer chromatography of the two fractions showed five components in the first fraction, with two major components having $R_f$ values of 0.55 and 0.96, and four components in the second fraction, with two major components having $R_f$ values of 0.45 and 0.96.

The two fractions were chromatographed separately on 1.2 x 22 cm. columns of Adsorbosil and developed with acetone. The first fraction afforded 0.5 g. of a yellow oil from the first 20 ml. of eluate which gave two spots on thin layer chromatography showing a major component having $R_f$ 0.95 and a minor component having $R_f$ 0.50. Continued elution with 75 ml. of acetone gave 0.2 g. of an oil which showed a single spot on thin layer chromatography having an $R_f$ of 0.51.

The second higher boiling fraction likewise afforded two components on column chromatography, the first (0.6 g.) obtained from the first 20 ml. of eluate having the higher $R_f$ and the second (about 0.3 g.) the lower $R_f$. The second fractions from both chromatographic separations (total weight of about 0.5 g.) were both identified as the desired 10 - acetoxy-8-(3-methyl-2-octyl)-2,5,5-trimethyl-1,2,3,4 - tetrahydro-5H-[1]benzopyrano[3,4-d]pyridine by chemical analysis and by their N.M.R. spectra.

EXAMPLE 24

10 - methoxy - 8 - (3 - methyl - 2 - octyl) - 2,5,5 - trimethyl - 1,2,3,4 - tetrahydro - 5H - [1]benzopyrano[3,4-d]pyridine By reacting 10 - hydroxy-8-(3-methyl-2-octyl)2-5,5-trimethyl - 1,2,3,4 - tetrahydro-5H-[1]benzopyrano[3,4-d]pyridine with methyl iodide in the presence of sodium ethoxide, there is obtained 10 - methoxy-8-(3-methyl-2-octyl)-2,5,5-trimethyl - 1,2,3,4 - tetrahydro - 5H - [1]benzopyrano[3,4-d]pyridine.

EXAMPLE 25

10 - carbamyloxy - 8 - (3 - methyl - 2 - octyl) - 2,5,5-trimethyl - 1,2,3,4 - tetrahydro-5H - [1]benzopyrano[3,4-d]pyridine By reacting 10-hydroxy-8-(3-methyl - 2 - octyl) - 2,5,5-trimethyl-1,2,3,4-tetrahydro-5H-[1]benzopyrano[3,4-d]pyridine with an equimolar amount of phosgene in the presence of dimethylaniline, and reacting the resulting chloroformate with liquid ammonia, there is obtained 10-carbamyloxy - 8 - (3-methyl - 2 - octyl)-2,5,5-trimethyl-1,2,3,4-tetrahydro-5H-[1]benzopyrano[3,4-d]pyridine.

EXAMPLE 26

10-(N-methylcarbamyloxy) - 8 - (3-methyl-2-octyl)-2,5,5-trimethyl - 1,2,3,4 - tetrahydro - 5H - [1]benzopyrano[3,4-d]pyridine By reacting 10-hydroxy-8-(3-methyl-2-octyl)-2,5,5-trimethyl - 1,2,3,4 - tetrahydro-5H-[1]benzopyrano[3,4-d]pyridine with an equimolar amount of phosgene in the presence of dimethylaniline, and reacting the resulting chloroformate with methylamine, there is obtained 10-(N-methylcarbamyloxy) - 8 - (3 - methyl-2-octyl)-2,5,5-trimethyl-1,2,3,4 - tetrahydro - 5H - [1]benzopyrano[3,4-d]pyridine.

EXAMPLE 27

10-(N,N-dimethylcarbamyloxy) - 8 - (3-methyl-2-octyl)-2,5,5 - trimethyl - 1,2,3,4 - tetrahydro-5H-[1]benzopyrano[3,4-d]pyridine By reacting 10-hydroxy-8-(3-methyl-2-octyl)-2,5,5-trimethyl - 1,2,3,4 - tetrahydro-5H-[1]benzopyrano[3,4-d]pyridine with an equimolar amount of phosgene in the presence of dimethylaniline, and reacting the resulting chloroformate with dimethylamine there is obtained 10-(N,N-dimethylcarbamyloxy) - 8 - (3 - methyl-2-octyl)-2,5,5-trimethyl - 1,2,3,4 - tetrahydro-5H-[1]benzopyrano[3,4-d]pyridine.

EXAMPLE 28

8-(3-methyl-2-octyl) - 10 - phosphonyloxy - 2,5,5 - trimethyl - 1,2,3,4 - tetrahydro - 5H - [1]benzopyrano[3,4-d]pyridine By reacting 10-hydroxy-8-(3-methyl-2-octyl)-2,5,5-trimethyl - 1,2,3,4 - tetrahydro-5H-[1]benzopyrano[3,4-d]pyridine with one molar equivalent amount of phosphorus oxychloride in an organic solvent inert under the conditions of the reaction, for example toluene, and in the presence of a basic catalyst, for example, pyridine, and reacting the resulting dichlorophosphinate with aqueous potassium carbonate, there is obtained 8-(3-methyl-2-octyl) - 10 - phosphonyloxy - 2,5,5 - trimethyl - 1,2,3,4-tetrahydro-5H-[1]benzopyrano[3,4-d]pyridine.

EXAMPLE 29

10 - acetoxy-8-(3-methyl-2-octyl)-2,5,5-trimethyl-1,2,3,4,13,14-hexahydro-5H-[1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with acetic anhydride using a procedure similar to that described in Example 23 hereinabove, there is obtained 10-acetoxy-8-(3-methyl-2-octyl)-2,5,5-trimethyl - 1,2,3,4,13,14 - hexahydro-5H-[1]benzopyrano[3,4-d]pyridine.

EXAMPLE 30

10 - methoxy-8-(3-methyl-2-octyl)-2,5,5-trimethyl-1,2,3,4,13,14-hexahydro-5H-[1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with methyl iodide in the presence of sodium hydroxide using a procedure similar to that described in Example 24 hereinabove, there is obtained 10 - methoxy-8-(3-methyl-2-octyl)-2,5,5-trimethyl-1,2,3,4,13,14-hexahydro-5H-[1]benzopyrano[3,4-d]pyridine.

EXAMPLE 31

10-carbamyloxy-8-(3-methyl-2-octyl) - 2,5,5 - trimethyl-1,2,3,4,13,14 - hexahydro - 5H - [1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with an equimolar amount of phosgene in the presence of dimethylaniline, and reacting the resulting chloroformate with liquid ammonia using a procedure similar to that described in Example 25 hereinabove, there is obtained 10-carbamyloxy-8-(3-methyl-2-octyl)-2,5,5-trimethyl - 1,2,3,4,13,14 - hexahydro-5H-[1]benzopyrano[3,4-d]pyridine.

EXAMPLE 32

10-(N-methylcarbamyloxy) - 8 - (3-methyl-2-octyl)-2,5,5-trimethyl - 1,2,3,4,13,14 - hexahydro - 5H - [1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with an equimolar amount of phosgene in the presence of dimethylaniline, and reacting the resulting chloroformate with methylamine using a procedure similar to that described in Example 26 hereinabove, there is obtained 10-(N-methylcarbamyloxy)-8-(3-methyl-2-octyl) - 2,5,5 - trimethyl - 1,2,3,4,13,14-hexahydro-5H-[1]benzopyrano[3,4-d]pyridine.

EXAMPLE 33

10-(N,N-dimethylcarbamyloxy) - 8 - (3-methyl-2-octyl)-2,5,5 - trimethyl-1,2,3,4,13,14-hexahydro-5H-[1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with an equimolar amount of phosgene in the presence of dimethylaniline, and reacting the resulting chloroformate with dimethylamine using a procedure similar to that described in Example 27 hereinabove, there is obtained 10-(N,N-dimethylcarbamyloxy)-8-(3-methyl-2-octyl)-2,5,5 - trimethyl - 1,2,3,4,13,14 - hexahydro-5H-[1]benzopyrano[3,4-d]pyridine.

EXAMPLE 34

8-(3-methyl-2-octyl) - 10 - phosphonyloxy - 2,5,5 - trimethyl - 1,2,3,4,13,14 - hexahydro-5H-[1]benzopyrano[3,4-d]pyridine By reacting 10-hydroxy-8-(3-methyl-2-octyl)-2,5,5-trimethyl - 1,2,3,4,13,14 - hexahydro - 5H - [1]benzopyrano[3,4-d]pyridine with one molar equivalent amount of phosphorus oxychloride in an organic solvent inert under the conditions of the reaction, for example toluene, and in the presence of a basic catalyst, for example pyridine, and reacting the resulting dichlorophosphinate with potassium carbonate using a procedure similar to that described in Example 28 hereinabove, there is obtained 8-(3-methyl-2-octyl)-10-phosphonyloxy - 2,5,5 - trimethyl - 1,2,3,4,13,14-hexahydro-5H-[1]benzopyrano[3,4-d]pyridine.

I claim:

1. A member of the group consisting of a compound having the formula

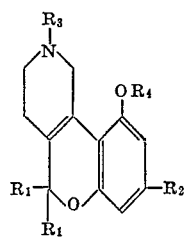

and a compound having the formula

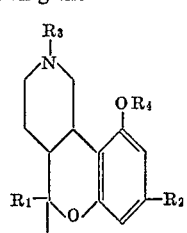

wherein $R_1$ and $R_3$ are each lower-alkyl; $R_2$ is a member of the group consisting of alkyl of from one to twenty carbon atoms and cycloalkyl-lower-alkyl containing from three to eight carbon atoms in the cycloalkyl moiety and $R_4$ is a member of the group consisting of hydrogen, lower-alkyl, lower-alkanoyl, carbamyl, N-lower-alkylcarbamyl, N,N-di-lower-alkylcarbamyl, and phosphonyl.

2. A compound having the formula

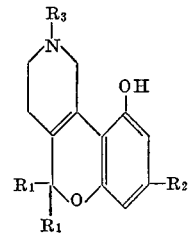

where $R_1$ and $R_3$ are each lower-alkyl and $R_2$ is alkyl of from one to twenty carbon atoms.

3. A compound having the formula

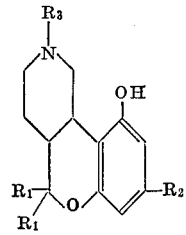

wherein $R_1$ and $R_3$ are each lower-alkyl and $R_2$ is alkyl of from one to twenty carbon atoms.

4. A compound having the formula

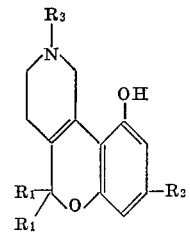

wherein $R_1$ and $R_3$ are each lower-alkyl and $R_2$ is cycloalkyl-lower-alkyl containing from three to eight carbon atoms in the cycloalkyl moiety.

5. A compound having the formula

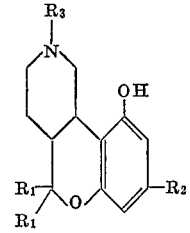

wherein $R_1$ and $R_3$ are each lower-alkyl and $R_2$ is cycloalkyl-lower-alkyl containing from three to eight carbon atoms in the cycloalkyl moiety.

6. A compound having the formula

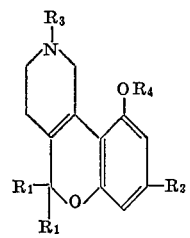

wherein $R_1$ and $R_3$ are each lower-alkyl; $R_2$ is alkyl of from one to twenty carbon atoms; and $R_4$ is lower-alkanoyl.

7. A compound having the formula

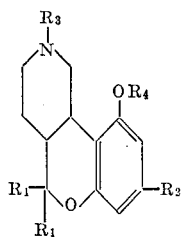

wherein $R_1$ and $R_3$ are each lower-alkyl; $R_2$ is alkyl of from one to twenty carbon atoms; and $R_4$ is lower-alkanoyl.

8. 10 - hydroxy-2,5,5,8-tetramethyl-1,2,3,4-tetrahydro-5H-[1]benzopyrano[3,4-d]pyridine.

9. 10-hydroxy-8-(3-methyl -2 - octyl)-2,5,5-trimethyl-1,2,3,4-tetrahydro-5H-[1]benzopyrano[3,4-d]pyridine.

10. 10-hydroxy - 8 - (3 - methyl - 2 - octyl)-2,5,5-trimethyl-1,2,3,4,13,14-hexahydro - 5H - [1]benzopyrano[3,4-d]pyridine.

11. 10-acetoxy-8-(3-methyl - 2 - octyl)-2,5,5-trimethyl-1,2,3,4-tetrahydro-5H-[1]benzopyrano[3,4-d]pyridine.

References Cited

Anker et al.: J. Chem. Soc. (London), 58–60 (1946).

HENRY R. JILES, Primary Examiner

G. T. TODD, Assistant Examiner

U.S. Cl. X.R.

260—294.7, 295, 297; 424—267, 263